(12) United States Patent
Huang et al.

(10) Patent No.: US 7,170,650 B2
(45) Date of Patent: Jan. 30, 2007

(54) LUMINOUS APPARATUS CAPABLE OF ADJUSTING THE LUMINANCE

(76) Inventors: Yin-Chun Huang, 6F, No. 72-11, Lane 531, Sec. 1, Guangfu Rd., Hsinchu (TW); Chien-Liang Yeh, 5F-2, No. 106, Huayuan St., Hsinchu (TW)

( * ) Notice: Subject to any disclaimer, the term of this patent is extended or adjusted under 35 U.S.C. 154(b) by 892 days.

(21) Appl. No.: 10/119,959

(22) Filed: Apr. 11, 2002

(65) Prior Publication Data

US 2002/0159105 A1   Oct. 31, 2002

(30) Foreign Application Priority Data

Apr. 27, 2001   (TW) .............................. 90206870 U (51) Int. Cl.
*H04N 1/04* (2006.01)
(52) U.S. Cl. ...................... 358/474; 358/475; 358/509; 250/208.1; 250/528.1
(58) Field of Classification Search ................ 358/474, 358/509, 475, 505, 482; 250/528.1, 358, 250/234, 208.1
See application file for complete search history.

(56) References Cited

U.S. PATENT DOCUMENTS

| | | | | |
|---|---|---|---|---|
| 4,692,795 A | * | 9/1987 | Nakao | 358/509 |
| 5,768,663 A | * | 6/1998 | Lin | 399/220 |
| 6,037,582 A | * | 3/2000 | Youngers et al. | 250/234 |
| 6,646,769 B1 | * | 11/2003 | Fang | 358/509 |

* cited by examiner

*Primary Examiner*—Kimberly Williams
*Assistant Examiner*—Negussie Worku
(74) *Attorney, Agent, or Firm*—Berkeley Law & Technology Group LLC (57) ABSTRACT

A luminous apparatus capable of adjusting the luminance is equipped in a scanner. Before mounting the luminous apparatus in the scanner, a detective device is used for detecting luminance generated from the luminous apparatus. The luminous apparatus contains the electroluminescent elements, the branching levers, and the main lever. One end of each electroluminescent element is pivoted by a pivot while the other end is connected to one branching lever correspondingly. The main lever is connected to those branching levers. When the main lever is moved by an external force, the branching levers are moved and the electroluminescent elements synchronous rotate around their own pivots. Additionally, the positions of the main lever and the electroluminescent elements are fixed when a uniform luminance is detected.

12 Claims, 6 Drawing Sheets

LUMINOUS APPARATUS CAPABLE OF ADJUSTING THE LUMINANCE

This application incorporates by reference Taiwanese application Serial No. 090206870, filed Apr. 27, 2001.

BACKGROUND OF THE INVENTION

1. Field of the Invention

The invention relates in general to a luminous apparatus, and more particularly to the luminous apparatus capable of adjusting the luminance.

2. Description of the Related Art

In the Age of high technology, scanner has been required in the modern life due to its great functions of scanning the original drafts, such as the pictures, the photos, and documents, and then transforming and saving the image as the digital files. It is a very convenient way for the users to keep or find the original drafts. The structure and the principle of the scanner are described below.

Figure 1A:
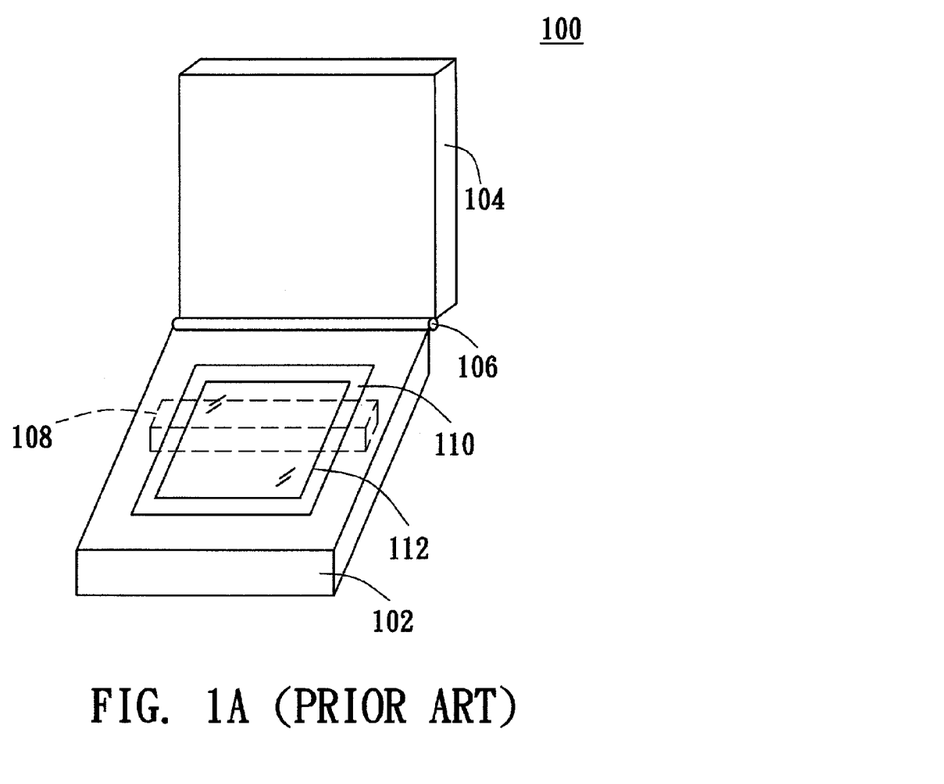
FIG. 1A (prior art) depicts the diagram of the general flatbed scanner.

Referring to FIG. 1A, which depicts the diagram of the general flatbed scanner. The scanner 100 has a base 102 and a lid 104, and one end of the lid 104 is attached to one end of the base 102 with a hinge 106, that allows the pivoting of the lid 104 on the base 102. The base 102 includes a chassis 108 and a transparent platform 110, which the chassis 108 is removable situated inside the base 102 in order to capture the image of the original draft 112 step by step.

Figure 1B:
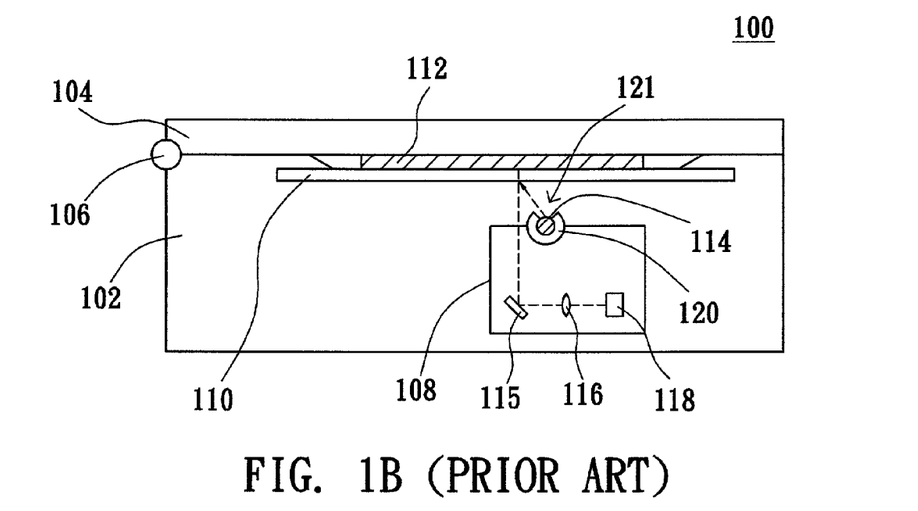
FIG. 1B (prior art) depicts the side view of the scanner in FIG. 1A.

Referring to FIG. 1B, which depicts the side view of the scanner in FIG. 1A. The chassis 108 includes the light source, the reflector 115, the lens 116, and the photo-electronic sensing device 118. Generally, the light source is a fluorescent lamp 114 with a single tube, which the fluorescent lamp 114 is equipped in the carriage 120 to radiate through the aperture 121 of the carriage 120, and provide the light required for scanning. Additionally, the reflector 115, the lens 116, and the photo-electronic sensing device 118 are all equipped inside the chassis 108. Before scanning the original draft 112, the base 102 have to be covered with the lid 104 to prevent the scanning process from interference by the external light, and the quality of the obtained image won't be affected thereby. During scanning, the light emitted from the fluorescent lamp 114 is reflected by the original drafts 112, and then further reflected by the lens 116 and focused on the photo-electronic sensing device 118 by the lens 116. Afterward, the light signal received by the photo-electronic sensing device 118 is converted into electronic signals, and then produce machine-readable data, which is representative of the image of the original drafts 112. The photo-electronic sensing device 118 can be any device capable of converting the light signal into the electric signal, such as Charged Coupled device (CCD) or Contact Image Device (CIS).

Additionally, the chassis 108 is driven by the stepping motor (not shown in FIG. 1B) to move slightly toward the direction corresponding to the un-scanned area after the light signal is received by the photo-electronic sensing device 118, and then the image of the un-scanned portion of the original draft 112 is captured by the photo-electronic sensing device 118, and further converted into the readable digital data. The above-mentioned steps are performed repeatedly until the original draft 112 is entirely scanned.

Figure 1C:
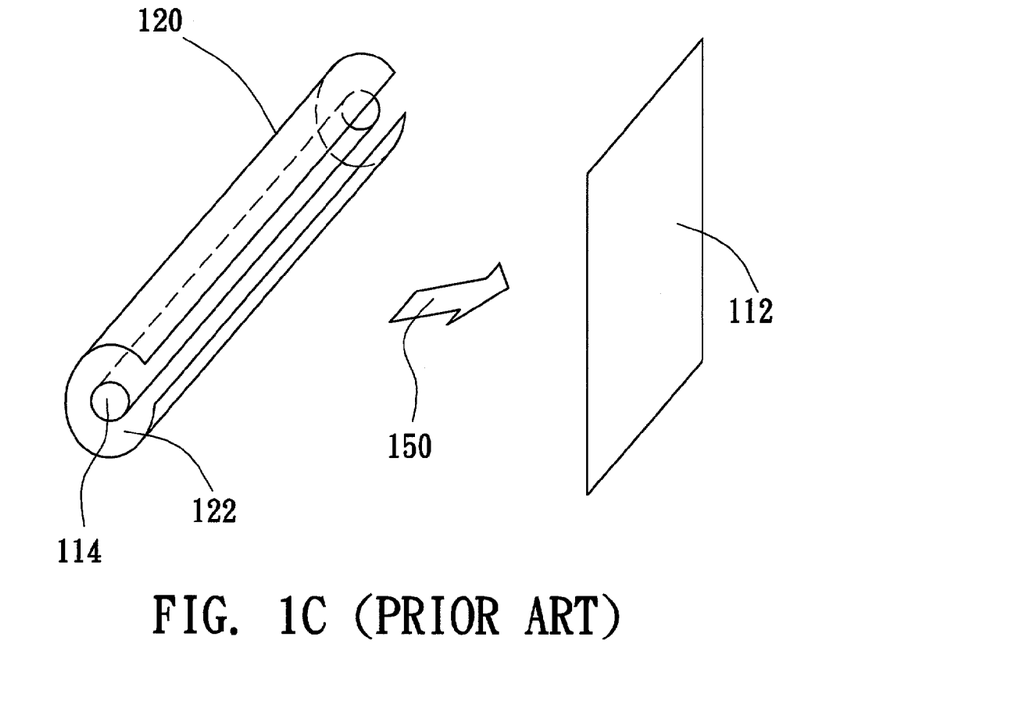
FIG. 1C (prior art) is the sketch of the optical path between the original draft and the fluorescent lamp in the carriage.

Referring to FIG. 1C, which is the sketch of the optical path between the original draft and the fluorescent lamp in the carriage. Usually, fluorescent lamp is a lamp that produces visible light by fluorescence, especially a glass tube whose inner wall is coated with a material that fluoresces when an electrical current causes a vapor within the tube to discharge electrons. Therefore, In FIG. 1C the fluorescent lamp 114 can produces visible light after the two end of the fluorescent lamp are electrified. In order to make the light beams from fluorescent lamp 114 effectively project on the original draft 112 along the direction of the arrow 150, the manufacturer commonly attaches a reflective film 122 in the inner side of the carriage 120, so that the light could be reflected by the reflective film 122 and then effectively projects on the original draft 112 through the aperture 121. However, the light intensity from the lamp varies both spatially and temporally along the length of the lamp, which means the light intensity close to the middle of the fluorescent lamp 114 is stronger than the two ends, so that the light projected on the original draft 112 are not even, and hence the light reflected by the original draft 112 are not even, either. In other words, the luminance of the surface of the original draft 112 is not uniform.

Figure 1D:
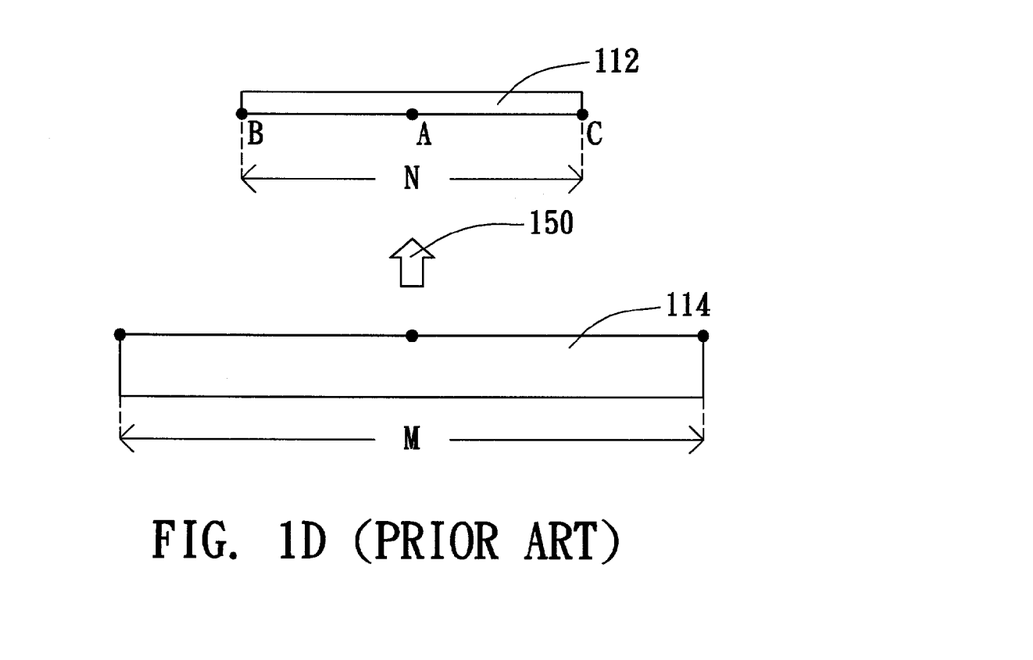
FIG. 1D (prior art) depicts the top view of the original draft and the fluorescent lamp of FIG. 1C.

Referring to FIG. 1D, which depicts the top view of the original draft and the fluorescent lamp of FIG. 1C. In FIG. 1D, the fluorescent lamp 114 is M in length, and the original draft 112 is N in length, N is usually smaller than M. The light emitted from the middle part of the fluorescent lamp 114 in stronger than the two ends, so that the luminance of point A of the original draft 112 is higher than points B and C while the light radiates along the direction of arrow 150. Such variation degrades the accuracy of scanned images.

Figure 1E:
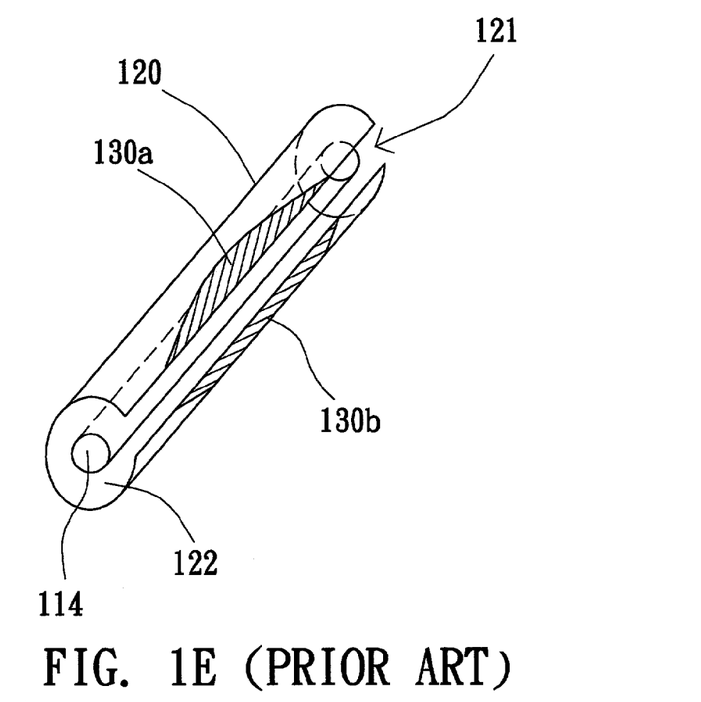
FIG. 1E (prior art) illustrates the carriage with the improved reflective film.
Figure 1F:
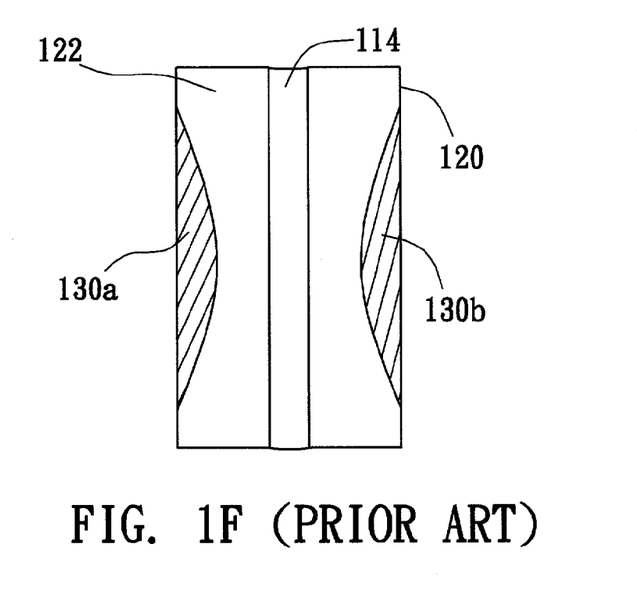
FIG. 1F (prior art) illustrates the carriage of FIG. 1E is unrolled.

To solve this problem, the reflective film 122 is further improved by the manufacturers, as shown in FIGS. 1E and 1F. FIG. 1E illustrates the carriage with the improved reflective film, and FIG. 1F illustrates the carriage of FIG. 1E is unrolled. For decreasing the intensity of the light, the light cutoff 130a and 130b are pasted up on the two edges of the reflective film 122, respectively. The light emitted from the fluorescent lamp 114 is reflected by the reflective film 122 through the light cutoff 130a and 130b, and consequently projected on the original draft 112 uniformly.

On the other hand, the luminance of the original draft 112 is also related to the light source. Generally, the light intensity of the single-tube fluorescent lamp is not enough, and the quality of scanned images could be degraded. But using the double-tubes fluorescent lamp make the scanner become bulky, and it is also difficult to control the luminance of the original draft 112. Additionally, if using a luminescent apparatus with high-brightness as the light source of the scanner, such as electroluminescent element, the light with strong intensity need to undergo the action of light cutoff for making the luminance of the original draft 112 uniform; however, the luminance of the original draft 112 is still affected due to the diffusion of the light.

SUMMARY OF THE INVENTION

It is therefore an object of the invention to provide luminous apparatus capable of adjusting the luminance. The luminance is detected by the detective device, such as a sensor or a luminometer. The position of the electroluminescent elements that generates radiation can be adjusted by a motor or by hand. When a uniform luminance is detected by the detective device, the positions of the main lever and the electroluminescent elements are fixed, and then, the luminous apparatus is situated in the scanner. The scanner equipped with the luminous apparatus of the invention increases the quality of the scanned image, and avoid the imperfect situations, such as distortion of the image.

According to the objective of the invention, a luminous apparatus capable of adjusting the luminance equipped in a scanner is provided. Before mounting the luminous apparatus in the scanner, a detective device is used for detecting luminance generated from the luminous apparatus. The luminous apparatus contains a plurality of electroluminescent elements and branching levers, and a main lever. The electroluminescent elements provide the light source for scanning, and one end of each electroluminescent element is pivoted by a pivot while the other end is connected to one branching lever correspondingly. The main lever is connected to those branching levers. When the main lever is moved by an external force, the related branching levers are moved and the electroluminescent elements synchronous rotate around their own pivots. Additionally, when a uniform luminance is detected by the detective device, the positions of the main lever and the electroluminescent elements are fixed, and then, the luminous apparatus is equipped in the scanner.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

In order to achieve the objective of providing uniform luminance of the to-be-scanned original draft on the transparent platen, a luminous apparatus capable of adjusting the luminance according to the invention is equipped in the chassis of the scanner. The luminous apparatus contains the electroluminescent elements, the main lever and the branching levers. After applying the voltage, the electroluminescent elements generate radiation with high intensity as the light source for scanning. Structurally, one end of each electroluminescent element is pivoted while the other end is connected to one branching lever correspondingly, and every branching lever is connected to and controlled by the main lever. When the main lever is moved, the branching levers are relatively moved, and the electroluminescent elements synchronous rotate around their own pivots. Before the luminous apparatus is situated in the scanner, a detective device is placed in front of the electroluminescent elements for detecting radiation. During the swing of the electroluminescent elements, the different luminances are observed by means of the detective device.

Additionally, a fastening apparatus is further included in the invention for fixing the positions of the main lever and the electroluminescent elements while the uniform luminance is detected by the detective device. Afterward, the luminous apparatus is situated inside the chassis of the scanner to produce the uniform luminance for scanning the to-be-scanned document on the transparent platen. Therefore, the quality of the scanned image is increased, and the imperfection such as distortion of the image can be avoided.

The detail descriptions of the luminous apparatus of the invention are illustrated by examples 1 and 2.

EXAMPLE 1

Figure 2:
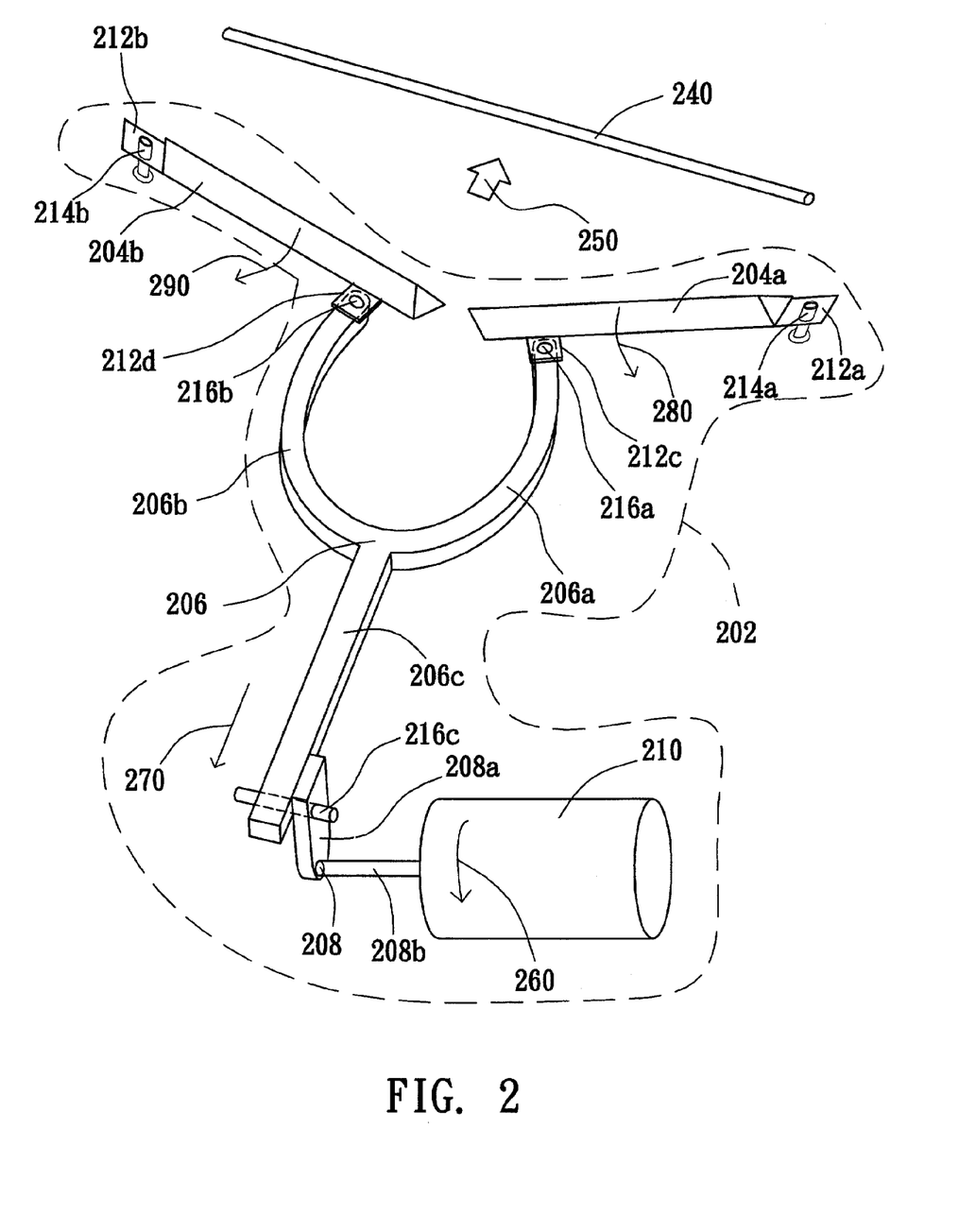
FIG. 2 depicts a luminous apparatus capable of adjusting the luminance according to the first embodiment of the invention.

Referring to FIG. 2, which depicts a luminous apparatus capable of adjusting the luminance according to the first embodiment of the invention. In FIG. 2, the detective device 240 for detecting the strength of the light could be a luminometer or a sensor. The luminous apparatus 202 (the region surrounded by the dotted line) includes the electroluminescent elements 204a and 204b, the lever arm 206, the angle lever 208, and the motor 210. The electroluminescent elements 204a and 204b are positioned at one side of the detective device 240, and the significant amount of radiation impinge onto the detective device 240 along the direction of arrow 250. Additionally, the extending pieces 212a and 212b, that are situated at the pivots 214a and 214b, are attached to the ends of the electroluminescent elements 204a and 204b, respectively, so that the electroluminescent elements 204a and 204b are able to swing around the pivots 214a and 214b. However, the distance M from the right end of the electroluminescent element 204a, or from the left end of the electroluminescent element 204b to the detective device 240 needs to be maintained at a fixed value. Also, there is still a certain distance between the left end of the electroluminescent element 204a and the right end of the electroluminescent element 204b, to prevent the electroluminescent elements 204a and 204b from colliding when they are collinear.

The lever arm 206 is a Y-shaped arm including the right lever 206a, the left lever 206b, and the main lever 206c, which the right lever 206a is connected to the extending piece 212c of the left end of the electroluminescent element 204a by the hinge 216a while the left lever 206b is connected to the extending piece 212d of the right end of the electroluminescent element 204b by the hinge 216b. The angle lever 208 contains a vertical lever 208a and a transverse lever 208b, which connect to each other and form a right angle. The end of the main lever 206c is connected to the vertical lever 208a by the hinge 216c, and the right hand side of the transverse lever 208b is situated in the motor 210 as a shaft thereof.

When the motor 210 is on and rotates counterclockwise as shown as the arrow 260 in FIG. 2, the unity of the transverse lever 208b and the vertical lever 208a also turn around along the direction of the arrow 260. Simultaneously, the lever arm 206 is drawn by the rotation of the vertical lever 208a and moves along the direction of the arrow 270. Because the ends of the electroluminescent elements 204a and 204b are mounted on the pivots 214a and 214b respectively, the electroluminescent element 204a swings counterclockwise (arrow 280) and the electroluminescent element 204b swings clockwise (arrow 290) while the lever arm 206 moving along the direction of the arrow 270. The variation of luminance during the swing of the electroluminescent elements 204a and 204b can be observed by means of the detective device 240.

Furthermore, the positions of the electroluminescent elements 204a and 204b can be altered by controlling the rotation of the motor 210 until finding the appropriate positions thereof. After the electroluminescent elements 204a and 204b are placed at the appropriate positions resulting in the uniform radiation detected by the detective device 240, the motor 210 is turn off immediately, in order to fix the positions of the main lever 206c, the electroluminescent elements 204a and 204b. Then, the detective device 240 is removed, and the luminous apparatus 202 of the invention is situated inside the chassis of the scanner to produce the uniform luminance for scanning the to-be-scanned document on the transparent platen. According to the invention, the quality of the scanned image is increased, and the imperfection such as distortion of the image can be avoided.

However, the invention is not limited by the technique described herein. It should be apparent to those skilled in the art that the modification could be performed under the spirit of the invention. For example, one side of the main lever 208b can be designed as saw-toothed to engage with the gear that is attached in the end of the transverse lever 208b, so that the lever arm 206 is moved forward and backward by the motor 210, and the electroluminescent elements 204a and 204b are swung thereby.

EXAMPLE 2

Figure 3A:
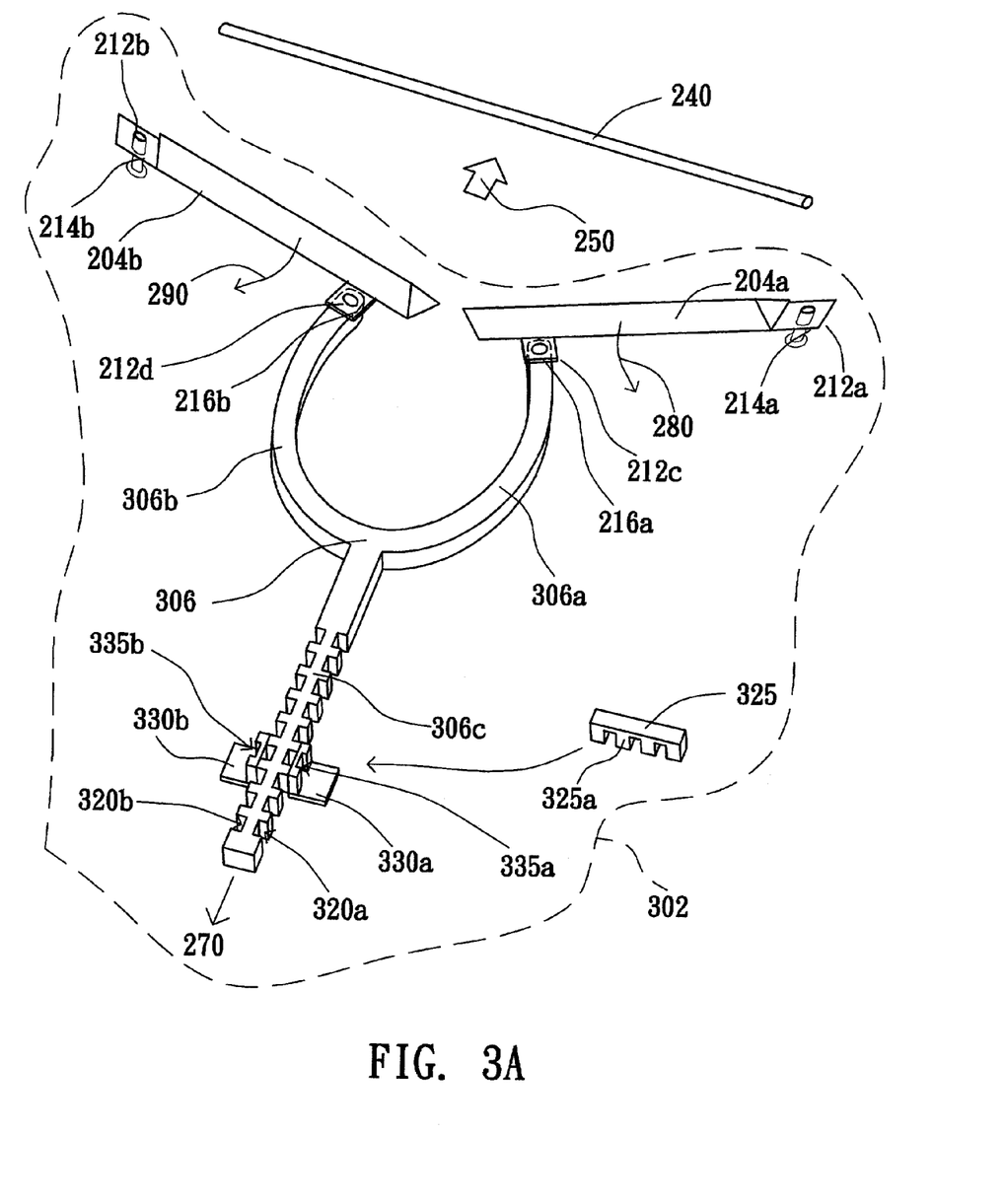
FIG. 3A depicts a luminous apparatus capable of adjusting the luminance according to the second embodiment of the invention.
Figure 3B:
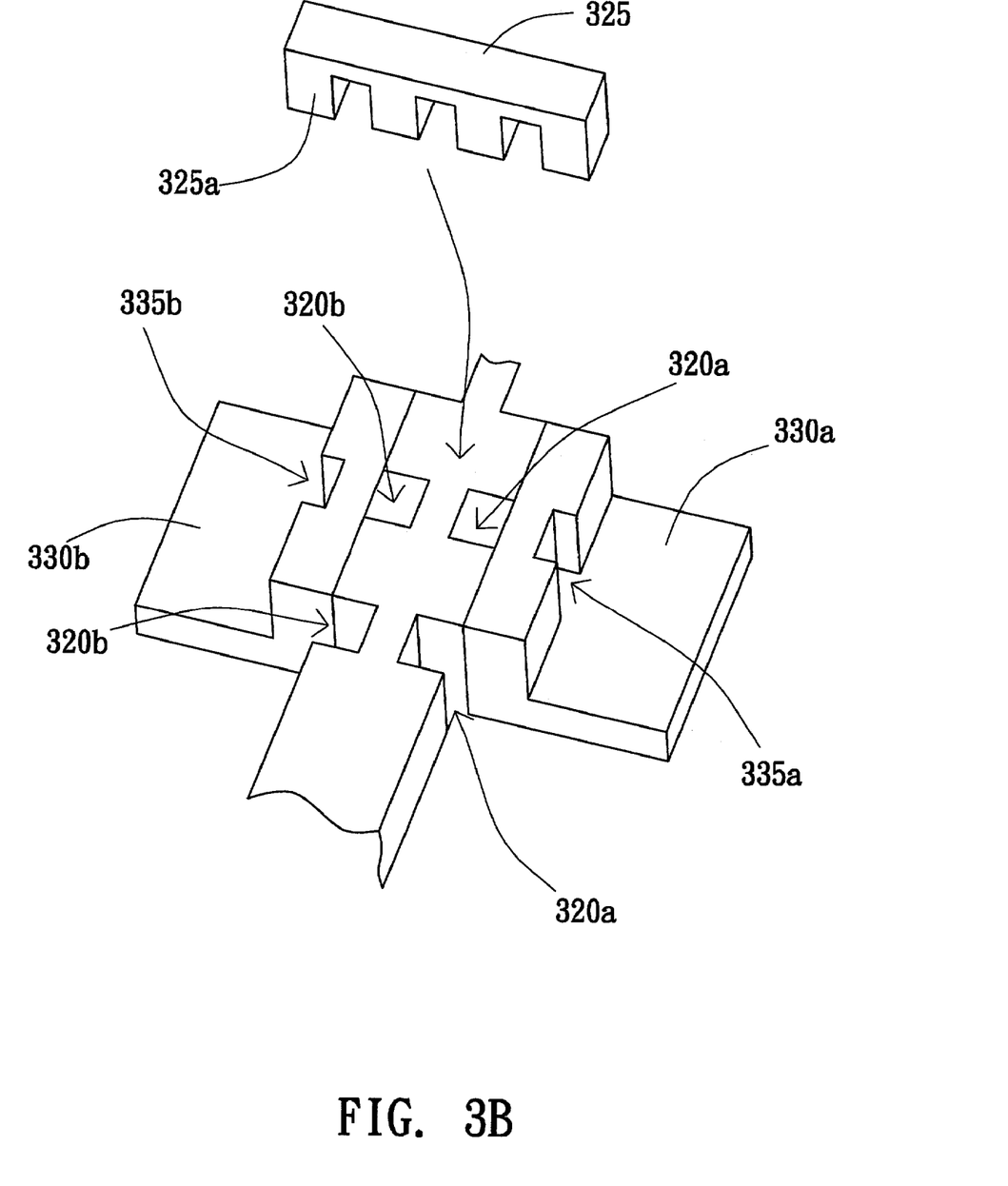
FIG. 3B is the enlarging drawing of the main lever, the plug and the sockets.

Referring to FIG. 3A, which depicts a luminous apparatus capable of adjusting the luminance according to the second embodiment of the invention. The main difference between the luminous apparatus 202 and 302 of the first embodiment and the second embodiment is the way of adjusting the position of the electroluminescent elements 204a and 204b. In FIG. 3A, the lever arm 306 is a Y-shaped arm including the right lever 306a, the left lever 306b, and the main lever 306c, which the right lever 306a is connected to the extending piece 212c of the left end of the electroluminescent element 204a by the hinge 216a while the left lever 306b is connected to the extending piece 212d of the right end of the electroluminescent element 204b by the hinge 216b. The two sides of the main lever 306c particularly have a plurality of the dents 320a and 320b. In order to fix the position of the main lever 306c, the sockets 330a and 330b, which have the dents 335a and 335b, are situated on the both sides of the main lever 306c. Additionally, the second embodiment of the invention further contains a plug 325 with four pins 325a, and the main lever 306c can be clasped by assembling the plug 325 and the sockets 330a and 330b. Referring to FIG. 3B, which is the enlarging drawing of the main lever, the plug, and the sockets. The plug 325 is put in the sockets 330a and 330b, and the pins 325a are engaged with the dents 335a, 330a, 330b, and 335b to fix the position of the main lever 306c. Consequently, the positions of the electroluminescent elements 204a and 204b are fixed.

During the adjustment in luminance, the main lever 306 is moved backward and forward manually along the direction of the arrow 270, as shown in FIG. 3A. Simultaneously, the electroluminescent element 204a swings counterclockwise along the direction of the arrow 280 while the electroluminescent element 204b swings clockwise along the direction of the arrow 290. The variation of luminance during the swing of the electroluminescent elements 204a and 204b can be observed by means of the detective device 240. After the electroluminescent elements 204a and 204b are manually moved to the appropriate positions resulting in the uniform radiation detected by the detective device 240, the main lever 306c is fixed at that position by engaging the pins 325a of the plug 325 with the dents 335a, 330a, 335b, and 330b; the positions of the electroluminescent elements 204a and 204b are consequently fixed at the appropriate positions. Then, the detective device 240 is removed, and the electroluminescent device 302 according to the second embodiment of the invention is situated inside the chassis of the scanner to produce the uniform luminance for scanning the to-be-scanned document on the transparent platen. Accordingly, the quality of the scanned image is increased, and the imperfection such as distortion of the image can be avoided.

However, the invention is not limited by the technique described herein. It should be apparent to those skilled in the art that the modification could be performed under the spirit of the invention. For example, the main lever 306c could be fixed at the appropriate position by the other joint apparatus, such as fastened by means of the screws.

Additionally, the luminous apparatus of the invention could contain more than one electroluminescent element, a number of the branches of a lever arm, or/and more than one main lever. In this condition, all of the electroluminescent elements provide the light source for scanning, and one end of each electroluminescent element is pivoted while the other end is connected to one branching lever correspondingly. When the main lever is moved, the branching levers connected to the main lever are also moved, and the electroluminescent elements synchronous rotate around their own pivots. At the moment, the detective device also detects the different luminance corresponding to the positions of the electroluminescent elements. A fastening apparatus for fixing the main lever is further included herein.

The luminous apparatus according to the first and the second embodiments of the invention, the detective device is used for detecting the luminance, and the positions of the electroluminescent elements can be adjusted by the motor or manually in order to find the appropriate positions, which produce the uniform luminance during scanning. The scanner equipped with the luminous apparatus of the invention increases the quality of the scanned image, and avoid the imperfect situations, such as distortion of the image.

While the invention has been described by way of examples and in terms of the preferred embodiments, it is to be understood that the invention is not limited to the disclosed embodiments. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A luminous apparatus capable of adjusting the luminance equipped in a scanner, and a detective device is used for detecting luminance of a light source generated from the luminous apparatus, the luminous apparatus comprising:

a plurality of electroluminescent elements for providing the light source, and one end of each electroluminescent element is pivoted by a pivot;

a plurality of branching levers, and one branching lever is connected to one electroluminescent element correspondingly; and a main lever connected to the branching levers, when the main lever is moved, the related branching levers are moved, and the electroluminescent elements synchronous rotate around their own pivots;

wherein the luminance is changed from the movement of the main lever, and the positions of the main lever and the electroluminescent elements are fixed when a uniform luminance is detected by the detective device, and then, the luminous apparatus is equipped in the scanner.

2. The luminous apparatus according to claim 1, wherein a motor is connected to the main lever for providing the power of moving the main lever.

3. The luminous apparatus according to claim 1, wherein the main lever is moved manually.

4. The luminous apparatus according to claim 3, wherein the luminous apparatus further comprises a fastening apparatus for fixing the position of the main lever when the uniform luminance is detected by the detective device.

5. The luminous apparatus according to claim 1, wherein the luminous apparatus includes two electroluminescent elements.

6. The luminous apparatus according to claim 5, wherein the luminous apparatus includes two branching levers.

7. The luminous apparatus according to claim 1, wherein the luminous apparatus includes more than two electroluminescent elements.

8. A luminous apparatus capable of adjusting the luminance equipped in a scanner, and a detective device is used for detecting luminance of a light source generated from the luminous apparatus, the luminous apparatus comprising:

a first electroluminescent element, which one end is pivoted by a first pivot;

a second electroluminescent element, which one end is pivoted by a second pivot;

a first branching lever, which is connected to the other end of the first electroluminescent element;

a second branching lever, which is connected to the other end of the second electroluminescent element;

a main lever, which is connected to the first and the second branching levers; and a motor, which is connected to the main lever for providing the power to move the main lever, and the related branching levers are moved also while the electroluminescent elements synchronous rotate around their own pivots;

wherein the luminance is changed from the movement of the main lever, and the motor is stopped for fixing the positions of the main lever and the electroluminescent elements which produce a uniform luminance detected by the detective device, and then, the luminous apparatus is equipped in the scanner.

9. The luminous apparatus according to claim 8, wherein the luminous apparatus further comprises:

a vertical lever connected to the main lever; and a transverse lever connected to the vertical lever to form an angle, and used as a shaft of the motor.

10. A luminous apparatus capable of adjusting the luminance equipped in a scanner, and a detective device is used for detecting luminance of a light source generated from the luminous apparatus, the luminous apparatus comprising:

a first electroluminescent element, which one end is pivoted by a first pivot;

a second electroluminescent element, which one end is pivoted by a second pivot;

a first branching lever, which is connected to the other end of the first electroluminescent element;

a second branching lever, which is connected to the other end of the second electroluminescent element;

a main lever connected to the first and the second branching levers, is moved manually and the related branching levers are moved also while the electroluminescent elements synchronous rotate around their own pivots, wherein the luminance is changed from the movement of the main lever; and a fastening apparatus engaged with the main lever for fixing the positions of the main lever and the electroluminescent elements which produce a uniform luminance detected by the detective device, and then, the luminous apparatus is equipped in the scanner.

11. The luminous apparatus according to claim 10, wherein the main lever has a first dent and a second dent at two sides, and the fastening apparatus comprise:

a first socket mounted at the one side of the main lever, and having a third dent;

a second socket mounted at the other side of the main lever opposite the first socket, and having a fourth dent; and a plug having a plurality of pins for inserting into the first dent, the second dent, the third dent, and the fourth dent, so that the position of the main lever is fixed by the assembly of the plug, the first socket, and the second socket.

12. The luminous apparatus according to claim 11, wherein the plug contains four pins.

* * * * *